United States Patent
Kurtin et al.

[11] 3,757,216
[45] Sept. 4, 1973

[54] ELECTRICAL TEST INSTRUMENT

[75] Inventors: Stephen L. Kurtin; Michael P. Anthony, both of Pasadena, Calif.

[73] Assignee: Keithley Instruments, Inc., Solon, Ohio

[22] Filed: Dec. 13, 1971

[21] Appl. No.: 207,262

[52] U.S. Cl. ............................. 324/149, 324/72.5
[51] Int. Cl. ..................... G01r 1/06, G01r 31/02
[58] Field of Search .................. 324/72.5, 156, 149

[56] References Cited
UNITED STATES PATENTS

| | | | |
|---|---|---|---|
| 2,586,806 | 2/1952 | Fowler | 324/72.5 X |
| 3,512,084 | 5/1970 | Roberts et al. | 324/72.5 |
| 3,555,420 | 1/1971 | Schwartz | 324/149 |
| 3,596,177 | 7/1971 | Butera | 324/72.5 X |

FOREIGN PATENTS OR APPLICATIONS

| | | | |
|---|---|---|---|
| 1,192,563 | 5/1970 | Great Britain | 324/149 |
| 557,766 | 2/1957 | Italy | 324/149 |
| 426,003 | 6/1967 | Switzerland | 324/72.5 |

*Primary Examiner*—Rudolph V. Rolinec
*Attorney*—J. Herman Yount, Jr.

[57] ABSTRACT

An electrical testing instrument for sensing and indicating electrical characteristics, such as the magnitudes of an unknown voltage source, or of a resistance. The instrument is provided with a probe having a contact tip which is electrically connected to sensing circuitry located in an instrument housing by means of an interconnecting conductor carrying cable. The contact tip on the probe is adapted to engage a portion of a test circuit means having such a characteristic to be sensed by the instrument. The instrument housing contains electrical circuitry including sensing circuit means and power supply means for energizing the sensing circuitry. The sensing circuitry has an input circuit connected to the probe's contact tip through a conductor carried by the cable, and an output circuit which serves, when the sensing circuitry is operative, to provide electrical signals representative of the sensed characteristic. The probe carries a switch which is electrically connected through a conductor carried by the cable to the electrical circuitry in the instrument housing in such a manner that the switch may be selectively actuated to render the sensing circuitry operative or nonoperative. A visual display is also carried by the probe and is energized from the output circuit of the sensing circuitry by conductors carried by the cable. With this construction a visual display is provided only when the probe switch is actuated to cause the sensing circuitry to be operatively energized. Battery drain is minimized since operating power for the sensing circuitry and visual display is provided only when the probe switch is actuated.

9 Claims, 7 Drawing Figures

ELECTRICAL TEST INSTRUMENT

This invention relates to an electrical testing instrument for use in testing or sensing electrical characteristics such as voltage or resistance, and providing an indication thereof.

Electrical test instruments such as voltmeters and ohmmeters typically comprise an instrument housing containing sensing circuitry characteristics such as voltage or resistance of an unknown source, and displaying the magnitude thereof with a meter having a visual display located on one side of the instrument housing. Typically, the measuring circuitry has two input terminals respectively adapted to be connected to a pair of conductors used in the testing operation. One conductor is normally referred to as the ground lead and, in use, it is connected at one end to one of the instrument inputs and the other end is typically secured, as with a contact spring clip, to the chassis or other point of ground potential of an electrical circuit being tested. The other conductor is typically referred to as the test lead and, in use, has one end connected to the other input of the instrument and the opposite end is provided with a probe or insulated handle having an electrical rod or contact tip extending therefrom. The operator grasps the probe in his hand and then positions the contact tip to various portions of a test circuit at which he desires information such as voltage level or resistance. Consequently, the probe is moved from location to location during the testing operation by the operator. Typically, for each meter reading the operator must divert his attention from positioning the contact tip to a selected point in the circuit under test to look at the meter located on the instrument housing. It would be desirable that the meter's visual display be carried by the probe itself so that the operator need not divert his attention from the probe contact tip when selecting different portions of a circuit to be tested. It would be further desirable that such a probe include switching means to be actuated only when the operator requires a reading so as to thereby provide minimum drain on the power supply source. It would also be desirable that such a probe having a display thereon be adapted for storage in the instrument housing for conversion to a bench instrument, and that an auxiliary test lead be substituted for the probe for engaging selected portions of a test circuit.

One object of the present invention is to provide an improved test instrument employing a hand held probe having visual display means thereon to facilitate the operator's reading of electrical characteristics being tested.

A still further object of the present invention is to provide an electrical instrument employing a probe adapted to be held in one hand and having switching means selectively actuable to effect de-energization or energization of the instrument's measuring circuitry and visual display means.

It is a still further object of the present invention to provide a test instrument having a probe adapted to be held in one hand and having a visual display means thereon, with the instrument housing being provided with means for storing the probe to obtain a bench display instrument.

A still further object of the present invention is to provide a sensing instrument employing probe having a switch thereon which must be actuated for obtaining operating power for the sensing circuitry and the visual display and thereby minimize battery drain when the instrument is not in use.

In accordance with the present invention the instrument employs a probe having an electrical contact tip adapted for engagement with a portion of a test circuit means exhibiting an electrical characteristic to be sensed. A conductor carrying cable is secured at one end to the probe, with the cable carrying a plurality of conductors including at least one conductor connected to the contact tip. An instrument housing is connected to the other end of the cable and contains an electrical circuit including a sensing circuit and a power supply circuit for energizing the sensing circuit. The sensing circuit includes an input circuit connected to the other end of the probe conductor for, when the sensing circuit is operative, sensing the electrical characteristic and an output circuit for carrying electrical signals representative of the sensed characteristic. A switch is carried by the probe and is electrically connected through conductor means carried by the cable to the electrical circuit in the instrument housing in such a manner that the switch may be selectively operable to render the sensing circuit operative or nonoperative.

In accordance with a more limited aspect of the present invention, a visual display is provided on the probe and is electrically connected to the output circuit of the sensing circuit through conductor means carried by the cable so that a visual indication of the sensed characteristic is made available in response to actuation of the probe switch.

In accordance with a still further apsect of the present invention, the instrument housing employs terminal means for connection to one end of an auxiliary test lead together with an electrical contact located in the housing and associated with a probe receiving cavity for electrically engaging the probe contact tip. The electrical contact is electrically connected to the terminal means so as to thereby complete an electrical path from the terminal means to the probe contact tip, whereupon the instrument is converted to a bench display instrument.

The foregoing and other objects and advantages of the invention will become more readily apparent from the following description of the preferred embodiment taken in conjunction with the accompanying drawings which are a part hereof and wherein.

Figure 1:
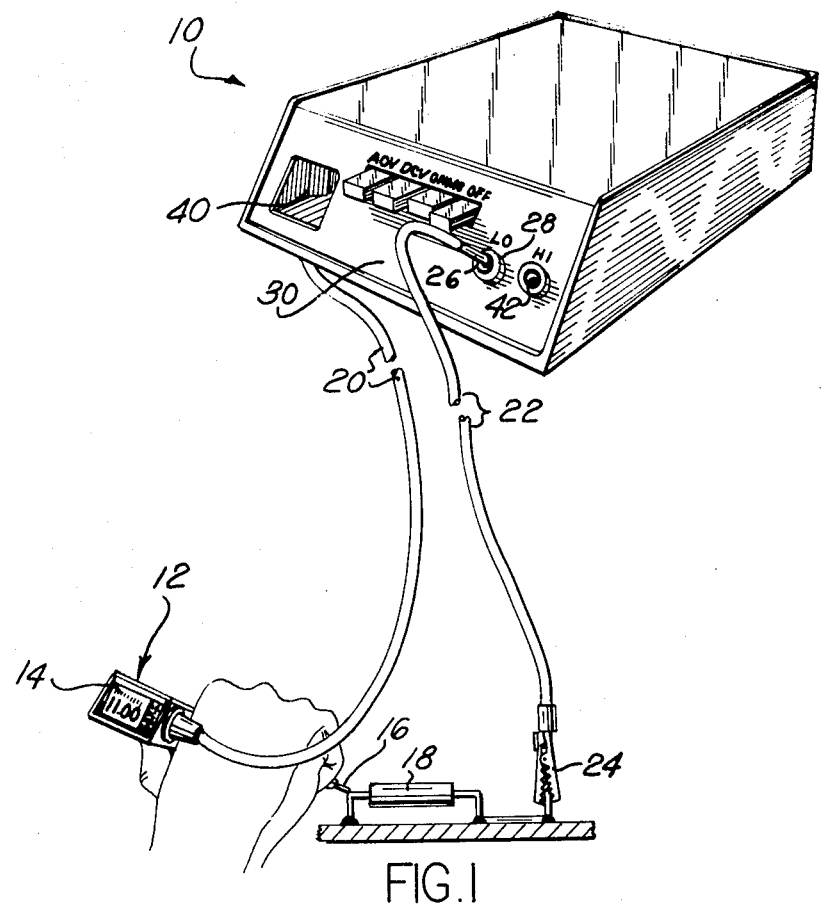
FIG. 1 is a perspective view of an electrical test instrument constructed in accordance with the present invention showing the manually held probe engaging one portion of a test circuit and a ground lead connecting the other end of the test circuit to one input of the instrument.

Referring now to the drawings wherein the showings are for purposes of illustrating the preferred embodiment of the invention only and not for purposes of limiting same, there is illustrated an electrical testing instrument including an instrument housing 10 and a probe 12. Probe 12 carries a visual display 14 at one end and a contact tip 16 at the opposite end for making electrical engagement with a portion of an electrical test circuit 18. A conductor carrying cable 20 interconnects probe 12 with electrical circuitry located within housing 10. As will be described in greater detail hereinafter, the electrical circuitry includes both a regulated power supply circuit and a measurement circuit. Cable 20 carries a plurality of conductors for communicating electrical signals between the electrical circuitry and contact tip 16 and with the visual display 14.

In use, a ground lead 22 serves to connect a second portion of test circuit 18 with the electrical circuitry in housing 10. Ground lead 22 includes a conventional contact spring clip 24 at one end adapted to engage a portion of the test circuit 18, and a male contact prong 26 at the other end which is adapted to be plugged into a terminal jack 28 provided on the front sidewall 30 of housing 10. Although not shown in FIG. 1, probe 12 is provided with a push-to-read switch connected by conductors, carried by cable 20, to the electrical circuitry in housing 10. Actuation of the switch serves to effectively energize the measurement circuit to perform its measuring function. The output from the measurement circuit is rerouted by additional conductors through cable 20 to energize the visual display 14 so that the operator will be provided with a measurement reading. Consequently, the operator may position probe 12 from location to location within a test circuit and each time the push-to-read switch is actuated the operator will be provided with a measurement reading on the visual display 14 located on the end of probe 12. Since operating power is provided for the measuring circuit and visual display only when the push-to-read switch is actuated, there is effectively no drain on the batteries when the instrument is not in use.

Figure 2:
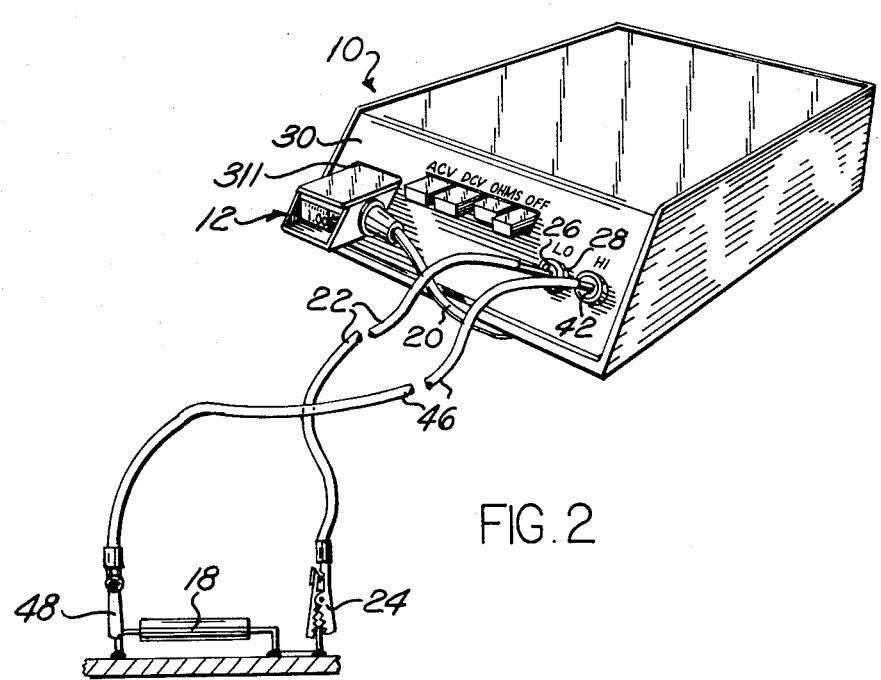
FIG. 2 is a perspective view similar to that of FIG. 1 but showing the probe stored in the instrument housing, which is being used as a bench instrument, with an auxiliary test lead and a ground lead extending therefrom to a circuit being tested.

The instrument may be converted to a hands-off bench display instrument by merely inserting probe 12 into a probe storage compartment 40 located in housing 10. As will be described in greater detail hereinafter, compartment 40 is provided with means for actuating the push-to-read switch carried by the probe when the probe is inserted into the compartment. In addition, the probe contact tip 16, when the probe is placed in the storage compartment 40, completes an electrical circuit to the "HI" terminal jack 42 located on the front sidewall 30 of housing 10. Consequntly, as shown in FIG. 2, this permits use of an auxiliary test lead 44 to be used in place of probe 12 by inserting its male prong member 46 into the terminal jack 42 and clipping its spring clip 48 to the other end of test circuit 18. The instrument is thereby converted to a bench display instrument with measurement readings being taken from the visual display 14 provided on the exposed end of probe 12. Having briefly described the illustrated embodiment of the invention, attention is now directed to the structural details shown in FIGS. 3 through 7.

Figure 3:
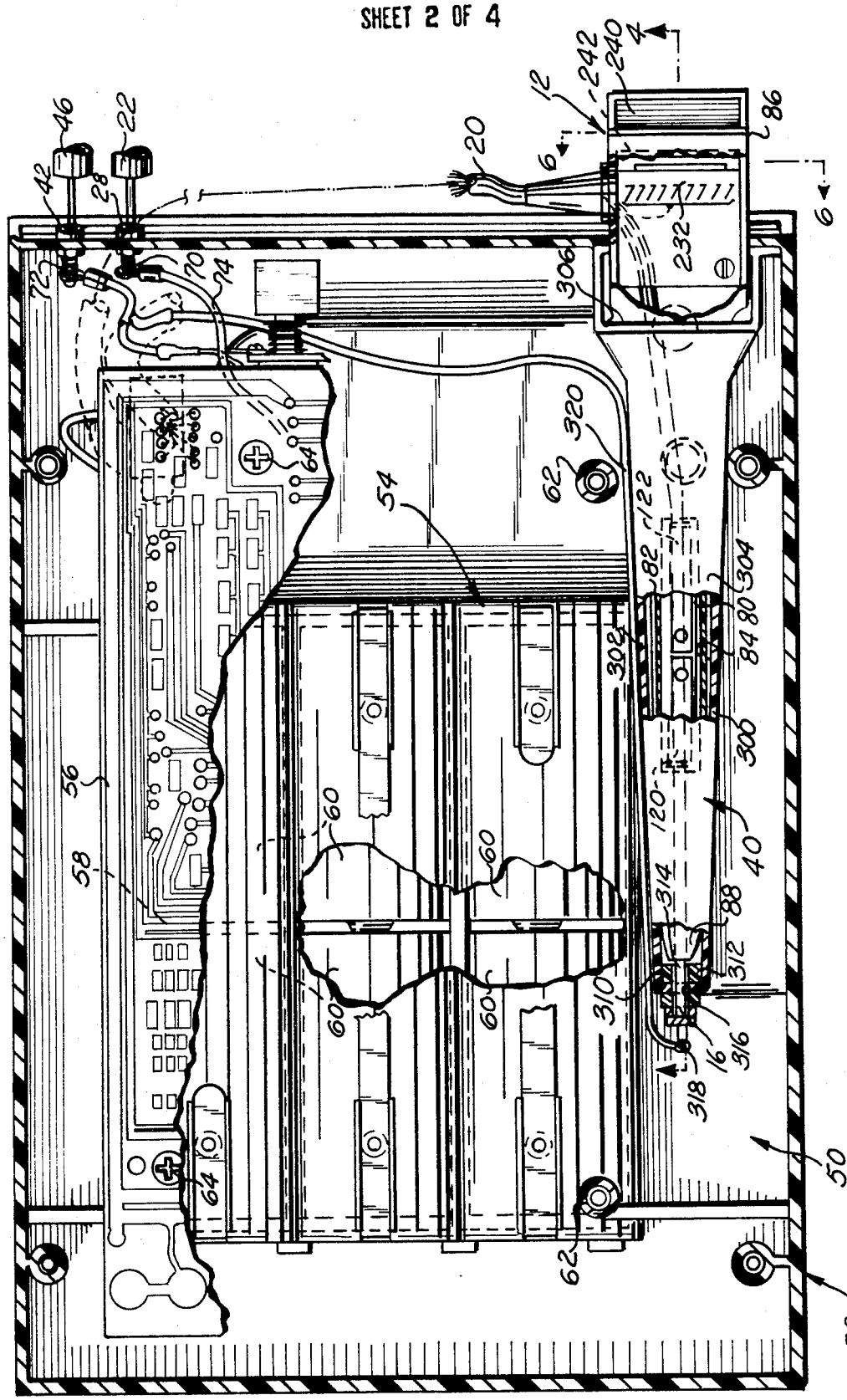
FIG. 3 is a fragmentary view taken generally along line 3—3 looking in the direction of the arrows in FIG. 2 with parts being broken away for clarity.

Referring now particularly to FIG. 3, there is illustrated a portion of the internal structure of instrument housing 10, including a support member 50 to which cover 52 of housing 10 is suitably secured. Support member 50 carries structure defining the probe storage compartment 40 and a battery compartment 54. Also, structure is provided for carrying a printed circuit board 56 which, in turn, carries the electrical measuring circuitry generally designated as circuitry 58. Battery compartment 54 contains a plurality of batteries 60 which are electrically connected in series to form a voltage supply source which is connected to the electrical circuitry 58, to be described in greater detail hereinafter with respect to the schematic diagram shown in FIG. 7. Preferably, but not necessarily, six 1.5 volt batteries are contained in battery chamber 54 and serve to provide a 9 volt supply source.

The printed circuit board 56 is spaced upwardly from support member 50 and is secured to posts 62 extending upwardly from member 54 by means of suitable screws 64. The LO and HI input terminal jacks 28 and 42 are mounted to the front sidewall 30 of housing 50 and are respectively provided with terminal studs 70 and 72 which extend inwardly into the housing. Ground lead 22 is plugged into the LO terminal jack 28 with its contact stud 70 being electrically connected to the electrical circuitry 58 by means of a conductor 74.

Figure 4:
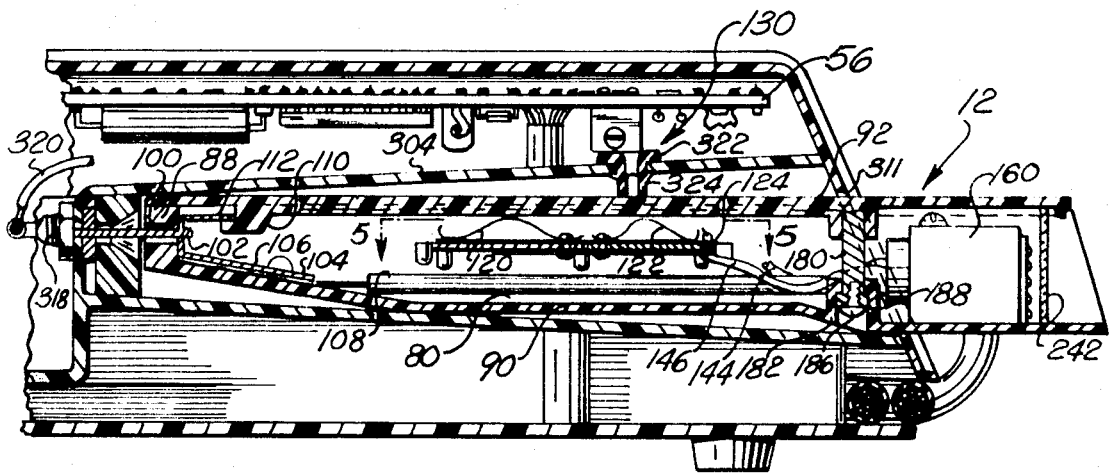
FIG. 4 is a cross-sectional view taken generally along line 4—4 looking in the direction of the arrows in FIG. 3 and showing the probe stored in the probe storage compartment.

Probe 12 is constructed as best shown in FIGS. 3 and 4, and includes an elongated handle portion 80 having opposed sidewalls 82 and 84 which converge toward each other from an enlarged head portion 86 to the probe end 88 from which the contact tip 16 extends. Probe 12 is preferably constructed of electrical insulating material, such as plastic, and the sidewalls 80 and 82 are integral with a bottom wall 90 so as to define a substantially U-shaped channel extending throughout the handle portion 84 and the head portion 86. A cover plate 92 serves to cover the U-shaped channel and this plate is substantially flat with its side edges converging from the head portion 86 to the probe end 88. The outer periphery of plate 92 corresponds essentially with the outer periphery of sidewalls 80 and 82. Contact tip 16 extends through an aperture 100 in probe end 88 and is provided with a threaded end 102 to which a U-shaped electrical contact 104 is threaded. Contact 104 has an elongated leg 106 resting on the floor of the U-shaped channel in the probe 40 and is electrically connected to one end of a probe conductor 108.

An L-shaped flange 110 extends downwardly from the lower surface of plate 92 with the extended leg being located just under the upper leg 112 of the U-shaped conductor plate 104. This provides a pivotal connection point for plate 92 so as to pivot upwardly and downwardly with respect to the upper surfaces of sidewalls 80 and 82. A pair of spring contacts 120 and 122 are mounted on a relatively flat printed circuit board 124 which, in turn, is supported by upstanding posts 126 and 128 extending upwardly from the floor of the probe housing. Springs 120 and 122 serve to normally bias plate member 92 upwardly about the pivot point so that the lower surface of plate 92 is elevated from the upper surfaces of sidewalls 80 and 82. When plate 92 is forced downwardly against the bias of spring contacts 120 and 122, as by an actuating member 130 extending into the probe chamber 40, spring contacts 120 and 122 electrically engage stationary electrical contacts 132 and 134, respectively, which are carried on the upper surface of printed circuit board 124.

Figure 5:
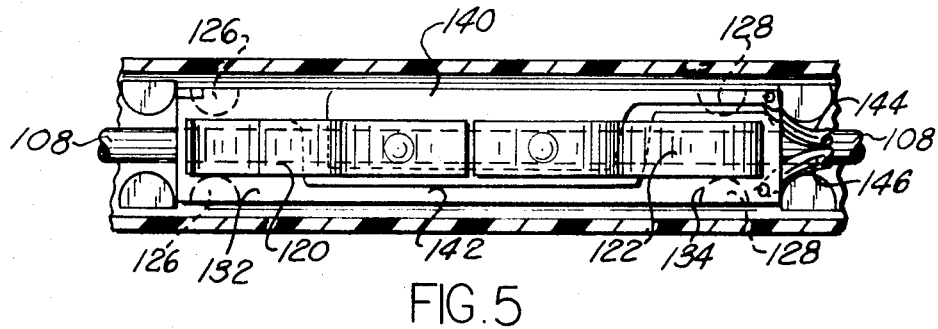
FIG. 5 is an enlarged fragmentary view taken generally along line 5—5 looking in the direction of the arrows in FIG. 4 and showing the construction of the probe switch.

As best seen in the fragmentary view of FIG. 5, printed circuit board 124 is carried by a first pair of support posts 126 and a second pair of support posts 128 provided in the probe housing so that the printed circuit board lies flat. Spring contacts 122 and 120 are electrically connected together by a conductor portion 140 provided on the upper surface of the electrically insulated printed circuit board 124. Stationary contacts 132 and 134 are electrically connected together by a conductor portion 142. Conductor portion 140 is suitably connected to an electrical conductor 144 and conductor portion 142 is similarly connected to an electrical conductor 146. Conductors 144 and 146 as well as the probe conductor 108 extend through the U-shaped channel to a terminal block 160 carried in the head portion 86 of the probe. From there, these three conductors exit from the probe and are carried by the conductor carrying cable 20.

Limited pivotal movement of probe plate 92 together with guidance of the movement is provided by a guide post 180 extending downwardly from the underside of plate 90 and slidably received within a cylindrical passage 182 provided in the floor portion of the probe. Plate 92 is secured to the floor by means of a screw 186 extending upwardly through passage 82 and threaded into post 180. Screw 186 cannot be pulled through passage 182 since its head is of greater diameter than the passageway and is stopped from this movement by angular stop flange 188.

Figure 6:
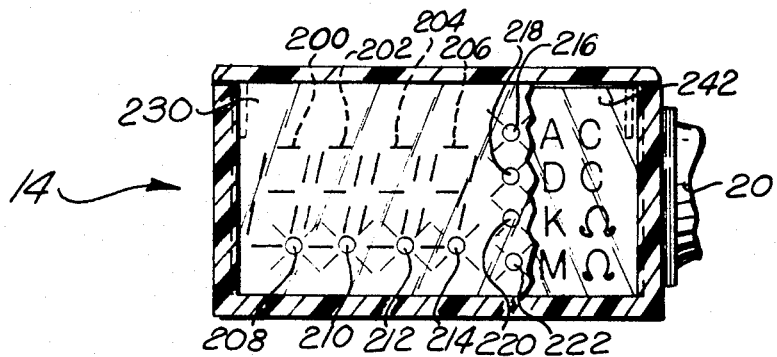
FIG. 6 is an enlarged sectional view taken generally along line 6—6 looking in the direction of the arrows of FIG. 3 illustrating the visual display carried by the probe; and, FIG. 7 is a schematic illustration of the invention.

The head portion of the probe carries the visual display 14 which includes a plurality of conventional figure-eight readout lights, each having an associated decimal point light. As shown in FIG. 6, display 14 employs four seven-bar segment, figure-eight readout lights 200, 202, 204 and 206 and their respective associated decimal point lights 208, 210, 212 and 214. In addition to these numerical character lights, the visual display 14 includes four additional lights 216, 218, 220 and 222 all spaced apart in a vertical column and being respectively adjacent to legends AC, DC, K and M. All of these lights are mounted on an insulator block 230 having provisions for electrical connections from the various lights to suitable conductors which extend through the block and are designated generally by the character 232 and are carried to the electrical circuitry within instrument housing 10 by means of cable 20. The visual display 14 is seen through a window 240 at the end of head portion 86 of probe 12 between window 240 and the visual display 14 there is provided a suitable tinted lens 242 on which is inscribed the designations AD, DC, K$\Omega$ and M$\Omega$.

The probe storage compartment 40 serves to receive the handle portion 80 of probe 12. Compartment 40 is formed by upstanding compartment sidewalls 300 and 302 which extend upwardly from support member 50 and are connected by a compartment roof 304. Sidewalls 300 and 302 extend from a flared probe receiving opening 306 and converge toward each other with a taper corresponding to that of opposed sidewalls 80 and 82 of probe 12 and terminate in an interconnecting end wall 310. A spacer 312 is mounted on the interior side of end wall 310 and is provided with an aperture 314 for slidably receiving contact tip 16 of probe 12. Similarly, end wall 310 is provided with an aperture 316 in registry with that of aperture 314 through which the contact tip 16 may pass. Secured to the exterior side of end wall 310 there is provided an electrical contact 318 which serves to electrically contact probe tip 316 when it is inserted through apertures 310 and 316. Electrical contact 318 is, in turn, electrically connected to the HI terminal post 72 by means of an interconnecting conductor 320.

The flared opening 306 of the probe storage compartment 40 is rectangular shaped, in cross section, and is of sufficient size to receive a portion of the enlarged head portion 86 of probe 12. Opening 306 is in registry with a similar sized opening 311 provided in the front sidewall 30 of housing cover 52 so as to provide access to the probe storage compartment. The probe storage compartment roof 304 and the opposing compartment floor 320 converge toward each other, as best shown in FIG. 4, and terminate in end wall 310. The push-to-read actuator 130 is carried in compartment roof 304 and takes the form of a rivet like member having an enlarged head 322 and an actuator body portion 324. Body portion 324 extends through roof 304 into the storage compartment so that when probe 12 is inserted into the compartment the end of the body portion engages probe cover plate 92 and forces the cover plate to pivot downwardly, causing the spring contacts 120 and 122 to engage either or both stationary contacts 132 and 134. When the probe is removed from the housing the switch closure may be obtained by manually pressing cover plate 92 downwardly to force the spring contact to engage at least one of the stationary contacts.

Figure 7:
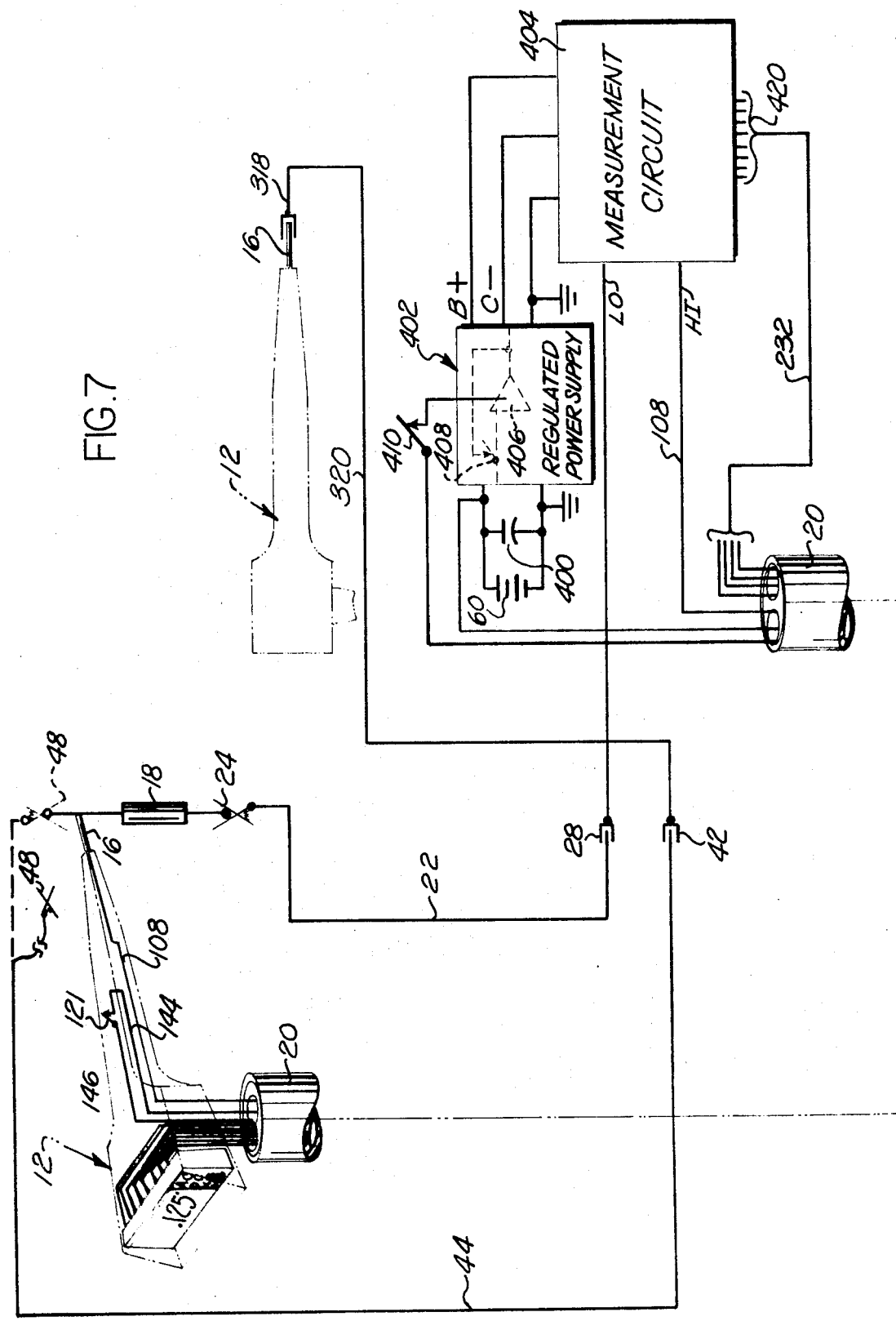

Reference is now made to FIG. 7, which schematically illustrates the structure and function described thus far.

Probe 12 is shown in its operative condition out of the instrument housing with its contact tip 16 in engagement with portion of an electrical test circuit 18. The probe's push-to-read switch 121 is illustrated as being closed. This completes a circuit through conductors 144 and 146 carried by cable 20 to the electrical circuitry in the housing. Battery 60 is connected across a capacitor 400 which, in turn, is connected to a regulated power supply circuit 402. The power supply circuit serves to provide, from the battery source, a positive output voltage B+, a negative output voltage C- and a ground potential. These three outputs are connected to the measuring circuit 404. Preferably, power supply circuit 402 employs a switching regulator circuit including a series switch, such as a transistor, and a switch control means. For purposes of illustration herein, the series switch is shown in dotted lines as switch 408 which is opened and closed by a control means 406. So long as switch 408 is open the power supply circuit does not drain battery 60. However, circuit 402 is not operative to provide a regulated output unless it receives bias potential from the battery 60 through the push-to-read switch 121. Both the push-to-read switch 121 as well as a series connected off pushbutton switch 410 must be closed for bias potential to be applied to the circuitry 406. The off pushbutton switch 410 is illustrated schematically in FIG. 7 and is illustrated as a pushbutton protruding from the face 30 of instrument housing 10 in FIGS. 1 and 2. When the pushbutton is depressed the switch is opened to prevent operation of the regulated power supply circuit 402 and, hence, prevent drain of battery 60. With the off switch 410 closed and with the push-to-read switch 121 closed the regulated power supply circuit will serve to supply a B+, C— and ground operation potential for measuring circuit 404.

The measuring circuit 404 has a LO input and a HI input with the LO input being electrically connected to the LO input jack 28 which, in turn, is connected through ground lead 22 to one end of the test circuit 18. The opposite end of the test circuit 18 is in electrical engagement with probe contact tip 16 which makes electrical connection to the HI input of the measuring circuit through conductor 108, carried by the cable 20 back to the instrument housing.

When the instrument is converted to a bench display instrument, for the application as shown in FIG. 2 herein, probe 12 is positioned as shown by the dotted lines in FIG. 7, with probe contact tip 16 making engagement with electrical contact 318. Contact 318, in turn, is connected by conductor 320 to the HI input terminal jack 42. In this application, the auxiliary test lead 44 is employed having one end connected to the terminal jack 42 and, at the other end, its spring clip 48 in engagement with a portion of the test circuit 18 in place of the probe contact tip 16. When the probe 12 is located, as shown by the dotted lines in FIG. 7, the push-to-read switch 121 is closed by actuator 130 in the roof 304 of probe chamber 40 (see FIG. 3). As long as the off pushbutton is positioned to keep switch 410 closed, operating power is applied to the measuring circuit 404. When the off pushbutton is depressed, switch 410 opens to prevent drain on the battery. With operating power applied, the measuring circuit 404 receives the signals applied to its LO and HI input terminals and provides output signals at its output circuit 402 for purposes of driving the appropriate light bars in the visual display 14 carried on the exposed end of probe 12. In one embodiment of the invention, fourteen conductors were taken from the output circuit 420 of the measuring circuit for purposes of driving the visual display lights. These conductors are designated by the character 232 in the drawings herein, and the conductors are bundled together and carried by the cable 20 to probe 12 where the conductors are appropriately connected to the visual display readout lights.

From the description herein it is seen that the disclosed embodiment of the invention employs a probe 12 which has an electrical contact tip 16 extending from one end thereof and which is adapted to engage a portion of a test circuit, such as circuit 18. The test circuit exhibits a characteristic to be sensed, such as resistance or an unknown AC voltage source or a DC voltage source. A conductor carrying cable is connected at one end to the probe and serves to carry a plurality of conductors including the probe conductor 108 which interconnects probe contact 16 with the electrical circuitry contained within housing 10. The electrical circuitry includes both a sensing or measurement circuit 404 as well as a regulated power supply circuit 402 which serves to operatively energize circuit 404. Circuit 404 has a HI input circuit which is electrically connected by conductor 108 to the probe contact tip 16 and has an output circuit 420 for carrying electrical signals representative of the characteristic being sensed. The push-to-read switch 121 carried by the probe is electrically connected to the electrical circuitry in housing 10 and, more particularly, to the bias supply line for the regulated power supply circuit 402.

Thus, the push-to-read switch is selectively operable to render the measuring circuit 404 operative or nonoperative. The measuring circuit is normally nonoperative since switch 121 is normally open to prevent battery drain.

Although the invention has been described with respect to a preferred embodiment, it is to be appreciated that the invention is not limited to same as various modifications may be made to the disclosed structure and circuitry without departing from the spirit and scope of the invention as more particularly defined by the appended claims.

We claim:

1. An electrical sensing instrument comprising:
 a probe having an electrical contact tip adapted to engage a portion of a test circuit having a characteristic to be sensed;
 conductor carrying cable means connected at one end to said probe, said cable means carrying a plurality of conductors including at least one conductor connected to said contact tip;
 an instrument housing connected to the other end of said cable means and containing electrical circuit means including sensing circuit means and power supply means for operatively energizing said sensing circuit means;
 said sensing circuit means having an input circuit electrically connected to the other end of said one conductor for, when said sensing circuit means is operative, sensing said characteristic and an output circuit for carrying electrical signals representative thereof; and,
 switch means carried by said probe and electrically connected to said electrical circuit means by conductor means, carried by said cable means, in such a manner that said switch means is selectively operable to render said sensing means operative or not operative,
 said probe switch means has a normal off position for normally rendering said sensing means nonoperative and an on position for operatively energizing said sensing means,
 resilient means for normally resiliently biasing said switching means to its off position, and
 said instrument housing includes means for receiving said probe in such a manner to actuate said switching means to its on position.

2. An instrument as set forth in claim 1, including display means carried by said probe and electrically connected to the output circuit of said sensing circuit means so as to be energized thereby through conductor means in said cable means so that a said display is provided when said probe is received in the probe receiving means in said housing.

3. An instrument as set forth in claim 1 wherein said power supply means includes at least one battery, said probe switch means connects said battery to said electrical circuit means, and a normally closed off switch means actuatable to an open condition to prevent energization of said sensing circuit means and prevent battery drain when said probe is received in said probe receiving means.

4. An instrument as set forth in claim 2, wherein said housing has terminal means extending therefrom adapted for connection to one end of a test conductor having means at its opposite end for engaging said portion of said test circuit means; electrical contact means in said housing associated with said probe receiving means for electrically engaging said probe contact tip, and conductor means in said housing connecting said contact means with said terminal means so as to thereby provide a circuit path from a said test conductor to said probe conductor.

5. An electrical sensing instrument comprising:
a probe having an electrical contact tip adapted to engage a portion of a test circuit having a characteristic to be sensed;
conductor carrying cable means connected at one end to said probe, said cable means carrying a plurality of conductors including at least one conductor connected to said contact tip;
an instrument housing connected to the other end of said cable means and containing electrical circuit means including sensing circuit means and power supply means for operatively energizing said sensing circuit means;
said sensing circuit means having an input circuit electrically connected to the other end of said one conductor for, when said sensing circuit means is operative, sensing said characteristic and an output circuit for carrying electrical signals representative thereof; and,
switch means carried by said probe and electrically connected to said electrical circuit means by conductor means, carried by said cable means, in such a manner that said switch means is selectively operable to render said sensing means operative or not operative,
said power supply means includes a power supply regulating circuit connected to an energy source for supplying regulated power to said sensing means, said probe switch means being connected to said regulating circuit for selectively effecting deenergization or energization thereof from said energy source.

6. An instrument as set forth in claim 5, wherein said energy source includes at least one battery and said probe switch means connects said battery to the bias voltage input of said power regulating circuit.

7. An electrical sensing instrument comprising:
a probe having an elongated, electrically insulated, handle adapted to be held by a human hand;
an electrical contact tip extending from one end of said probe handle for electrically engaging a portion of a test circuit;
a visual display means carried by said probe for providing a visual indication of a sensed characteristic of a said test circuit, said visual display means being mounted on said probe so as to face in a direction opposite from the direction in which said contact tip extends from said handle;
an instrument housing;
sensing circuit means carried in said housing;
elongated conductor means connecting said sensing circuit means with said electrical contact tip and said display means for carrying electrical signals so that a said characteristic may be sensed and a said visual indication thereof be displayed; and
said housing having a probe storage compartment defined therein for receiving said contact tip and a substantial portion of the length of said probe handle such that said visual display means is exposed to visual view from the exterior of said housing so as to thereby obtain a bench display instrument.

8. An electrical sensing instrument comprising:
a probe having an elongated, electrically insulated, handle adapted to be held by a human hand;
an electrical contact tip extending from one end of said probe handle for electrically engaging a portion of a test circuit;
a visual display means carried by said probe for providing a visual indication of a sensed characteristic of a said test circuit;
an instrument housing;
sensing circuit means carried in said housing;
elongated conductor means connecting said sensing circuit means with said electrical contact tip and said display means for carrying electrical signals so that a said characteristic may be sensed and a said visual indication thereof be displayed;
said housing having a probe storage compartment defined therein for receiving said contact tip and a substantial portion of the length of said probe handle while said visual display means is exposed to visual view from the exterior of said housing so as to thereby obtain a bench display instrument,
said visual display means being mounted on said probe so as to face in a direction opposite from the direction in which said contact tip extends from said handle,
including switch means carried by said probe for selectively rendering said sensing circuit means operative or nonoperative to sense a said characteristic and cause display of a representation thereof by said display means.

9. An electrical sensing instrument comprising:
a probe having an elongated, electrically insulated, handle adapted to be held by a human hand;
an electrical contact tip extending from one end of said probe handle for electrically engaging a portion of a test circuit;
a visual display means carried by said probe for providing a visual indication of a sensed characteristic of a said test circuit;
an instrument housing;
sensing circuit means carried in said housing;
elongated conductor means connecting said sensing circuit means with said electrical contact tip and said display means for carrying electrical signals so that a said characteristic may be sensed and a said visual indication thereof be displayed;
said housing having a probe storage compartment defined therein for receiving said contact tip and a substantial portion of the length of said probe handle while said visual display means is exposed to visual view from the exterior of said housing so as to thereby obtain a bench display instrument,
said housing has bench terminal means mounted thereon adapted for connection with one end of an auxiliary test lead having means at its opposite end for electrically engaging a portion of a test circuit, electrical contact means in said housing associated with said storage compartment and positioned to make electrical engagement with said probe contact tip when said probe is received in said compartment, and conductor means connecting said electrical contact means with said bench terminal means so when said probe is in said compartment a circuit is completed from said one end of said auxiliary test lead through said bench terminal means, said conductor means, said electrical contact means, and from said probe contact through said probe conductor means to said sensing circuit means.

* * * * *